United States Patent [19]
Itoh et al.

[11] Patent Number: 6,005,616
[45] Date of Patent: Dec. 21, 1999

[54] FRAME-BY-FRAME COLOR IMAGE PICKUP APPARATUS

[75] Inventors: Hiroshi Itoh, Hachioji; Akihiro Kubota, Kokubunji; Yukihiro Sugimoto, Tokyo; Toshiyuki Noguchi, Fussa, all of Japan

[73] Assignee: Olympus Optical Co. Ltd., Tokyo, Japan

[21] Appl. No.: 08/844,755

[22] Filed: Apr. 21, 1997

[30] Foreign Application Priority Data

Apr. 26, 1996 [JP] Japan ................................. 8-107320

[51] Int. Cl.⁶ ...................................... H04N 9/04
[52] U.S. Cl. .............................. 348/269; 348/70
[58] Field of Search ................. 348/65, 70, 71, 348/234, 268, 269, 270, 272, 280, 281, 451, 452

[56] References Cited

U.S. PATENT DOCUMENTS

| | | | |
|---|---|---|---|
| 4,933,757 | 6/1990 | Kanno et al. | 348/71 |
| 4,989,075 | 1/1991 | Ito | 348/280 |
| 5,748,250 | 5/1998 | Markandey et al. | 348/451 |

FOREIGN PATENT DOCUMENTS 7-79448  3/1995  Japan ............................ H04N 9/79

*Primary Examiner*—Wendy Garber
*Assistant Examiner*—Andrew B. Christensen
*Attorney, Agent, or Firm*—Louis Weinstein

[57] ABSTRACT

In a frame-by-frame color image pickup apparatus, images of light components transmitted through red, green, and blue filters of a rotating filter are introduced to an image pickup device arranged in an optical path with rotating filter. The cells in the image pickup device are grouped into cell blocks, each block made up of four cells arranged in one horizontal row and four vertical columns. The rotational speed of the rotating filter is increased, and the cells within each block selected by switches for reading are fixed when an image is dynamic, a quarter of all the cells are read at one cycle of revolution of the rotating filter, and the remaining cells are interpolated to form one frame image. Color breakup is thus precluded. When an image is still, the cells selected are switched at each cycle of revolution of the rotating filter, and all the cells are read over four cycles of revolution of the rotating filter. Thus, a high resolution color image is obtained. The color image pickup apparatus thus improves virtually a pickup rate from the image pickup device, alleviating color breakup. The still image is presented without degrading its resolution.

16 Claims, 11 Drawing Sheets

FRAME-BY-FRAME COLOR IMAGE PICKUP APPARATUS

BACKGROUND OF THE INVENTION

1. Field of the Invention

The present invention relates to a frame-by-frame color image pickup apparatus comprising means for reading an image signal for each of the reference colors in a time series fashion, an image pickup device for switching cells being read, and a memory for making concurrent the image signals of the reference colors that have been read in a time series fashion.

2. Related Art Statement

The following two types of frame-by-frame color image pickup apparatuses are known. For simplicity, the following discussion assumes that the three reference colors are red (R), green (G) and blue (B).

FIG. 10 is a simplified block diagram showing a typical conventional frame-by-frame color image pickup apparatus 31.

An image pickup device 33 is arranged at the image plane in perpendicular alignment to the optical axis of an imaging lens or an image forming lens 32 for forming an optical image of an unshown subject, a rotating filter 34 having color filters that respectively transmit R, G and B light rays is mounted between the imaging lens 32 and the image pickup device 33, and the rotating filter 34 is driven by unshown driving means such as a motor.

By rotating filter 34, the R, G and B color filters are sequentially positioned in the light path, and optical images of R, G, and B wavelength components are formed on the image pickup device 33. In response to a scan signal in synchronization with the irradiation period of each of the R, G, and B light wavelengths, from a scanning control module 35, the image pickup device 33 performs photoelectrical conversion to output, in a time series fashion, signals corresponding to the image of each wavelength component (referred to as R, G and B signals).

Time-series R, G, and B signals are A/D-converted by an A/D converter 36 into corresponding digital R, G, and B signals, which are then sequentially stored in respective color memories 38R, 38G, and 38B under the control of a memory control module 37. These signals are read at the same timing and become concurrent color image data. The concurrent color image data is fed to a signal processing module 39 to be processed into R, G and B color signals. The R, G and B color signals are then fed to an unshorn color monitor display, where the image of the subject is presented in color or fed to an image recording apparatus to be recorded there.

Referring to a timing diagram shown in FIG. 11, an X-Y address type solid-state pickup device as the image pickup device 33 is scanned in a noninterlace fashion.

As shown in FIG. 11, the rotating filter 34 rotates by a full revolution over a period of 9T, and each of the R, G, and B color filters is present in the optical path for a period of approximately 3T with switching periods being approximately 1T. As shown, R-1, for example, represents a light ray that is incident to the image pickup device 33 via the R color filter during a first cycle of revolution. Thus, during a n-th cycle of revolution, an incident light ray through an I (I=R, G, or B) color filter is represented by I-n. Also shown are an effective output signal In the image pickup device 33 outputs to each of the memories 38R, 38G, and 38B, and output signals output by the memories 38R, 38G, and 38B.

The incident light ray transmitted through the rotating filter 34 sequences through R-1, G-1, B-1, R-2, G-2, B-2, R-3, .... Since during each of the durations t=0-T, 3T-4T, 6T-7T, ..., 3nT-(3n+1)T, ..., each switching section of the R, G, and B color filters transverses the optical path or in front of the image pickup device 33, the incident light rays are mixed in color. Represented by T here is a one frame period, and n=0, 1, 2, ....

Effective signals free from mixed color in response to the R, G, and B incident light rays are signals R1, G1, B1, R2, ..., which are stored and read during each of the durations t=T-3T, 4T-6T, 7T-9T, ..., (3n−2)T-3nT, ...

The effective output signals R1, G1, B1, R2, ... are A/D converted through the A/D converter 36, and then written onto the R memory 38R, G memory 38G, and B memory 38B for concurrency processing.

Digital R, G, and B signals are read from the memories 38R, 38G, 38B at the same timing, and are thus concurrency processed. The same signal is read from each of the memories 38R, 38G, and 38B a plural number of times until they are updated with the next effective signals. Concurrency processed signals are then subjected to required signal processings through the signal processing module 39.

Japanese Unexamined Patent Publication No. 7-79448 discloses another known technique. In this disclosure, a frame-by-frame color camera has been proposed in which an image corresponding to one field of each color is read from an image pickup device every cycle of revolution of a rotating filter, a determination of whether the image is still or dynamic is made, and one frame is constructed over two cycles of revolution when the image is still, or one frame is constructed by correlating one field with an image of another field resulting from one revolution when the image is dynamic. For the dynamic image, frame displaying is made possible over every cycle of revolution of the rotating filter to increase an image pickup rate in the frame-by-frame method and thus to reduce color breakup.

In the above known frame-by-frame color image pickup apparatus, if a subject moves while the R, G, and B tri-color signals are being stored in respective memories for concurrency processing, R, G, and B output images will fail to coincide with each other, causing color breakup and image blurring.

To solve this problem, the apparatus disclosed in Japanese Unexamined Patent Publication 7-79448 displays a frame using one field image within the time of one cycle of revolution of the rotating filter when the image is dynamic, but is subject to the image pickup rate limitation determined by a field. The disclosure states nothing about noninterlace scanning.

OBJECT AND SUMMARY OF THE INVENTION

Accordingly, it is an object of the present invention to provide a frame-by-frame color image pickup apparatus which presents a heightened image pickup rate and alleviates color breakup while precluding degradation of resolution during still image forming.

A frame-by-frame color image pickup apparatus of the present invention, which sequentially introduces three reference color spectrum light rays to a single image pickup device on a discrete time basis and then reads an image signal of each reference color in a time series fashion, comprises switching means for switching to comply with a dynamic image and a still image, an image pickup device having cells which are grouped into blocks, and selecting an arbitrary cell within each block from which a signal is read, and a memory for concurrently outputting a time series image signal for each reference color, wherein the image pickup device selects the arbitrary cell within each block by means of the switching means.

In the above arrangement, the cell selected from the block is changed in synchronization with the period during which the reference color signal for each color is read in time series in accordance with the dynamic image or still image. Thus, the apparatus presents a color image with less color breakup during display of a dynamic image, while presenting a high resolution color image during a still image displaying.

DETAILED DESCRIPTION OF THE PREFERRED EMBODIMENTS

Figure 1:
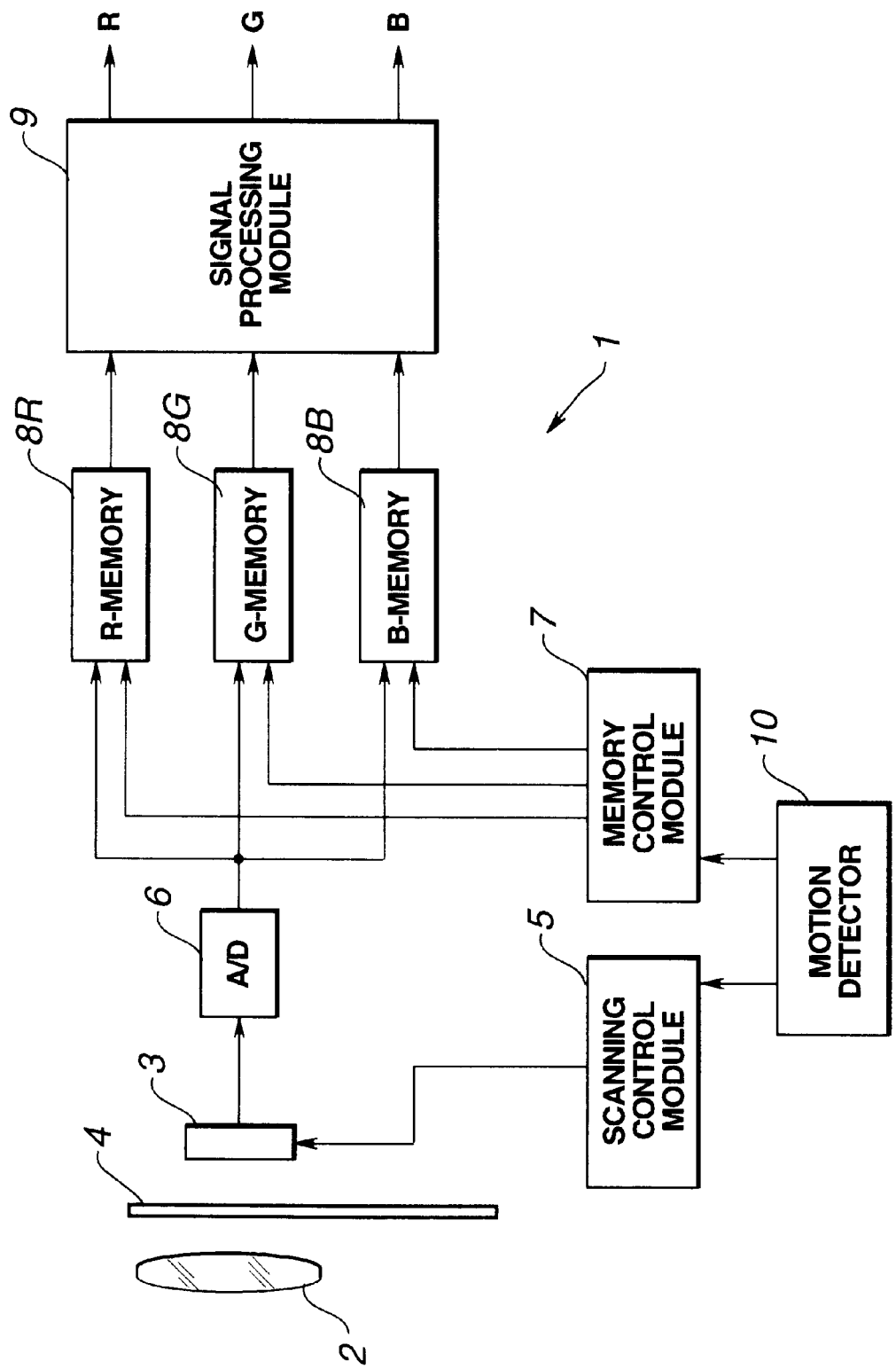
FIG. 1 is a block diagram showing a frame-by-frame color image pickup apparatus of a first embodiment of the present invention.

Referring now to the drawings, the embodiments of the present invention are discussed.

Figure 2:
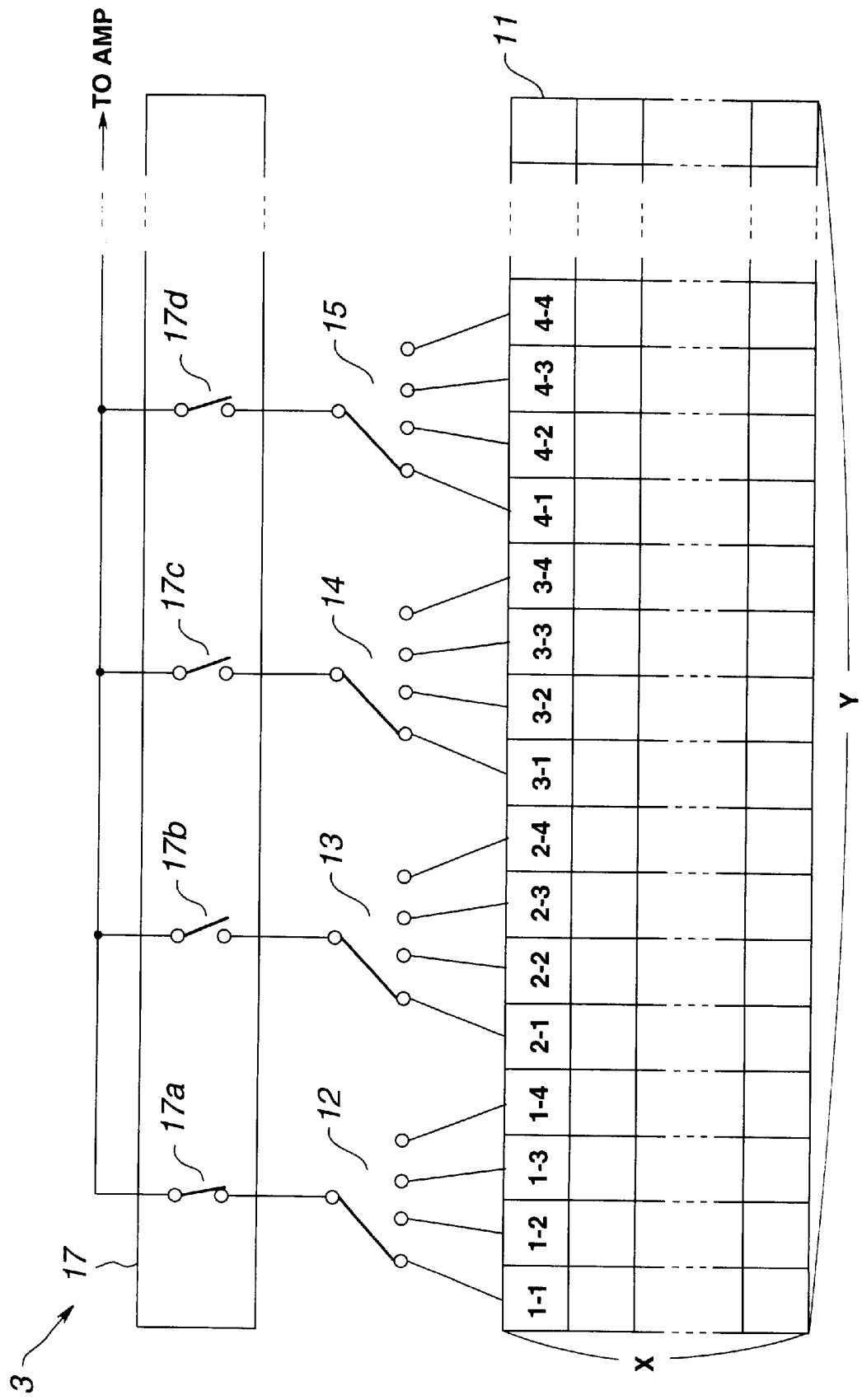
FIG. 2 shows a major portion of the image pickup device.
Figure 3:
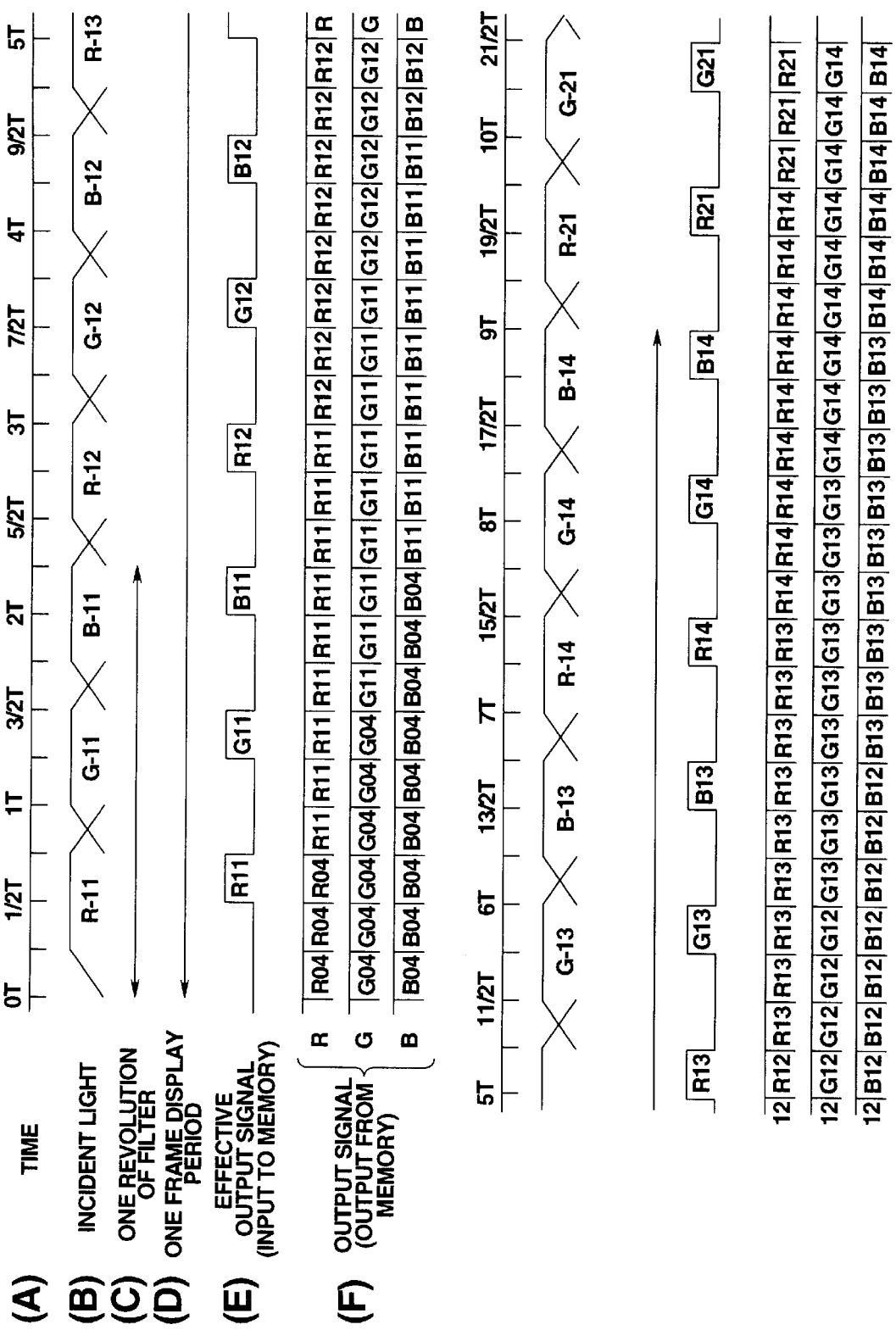
FIG. 3 is a timing diagram showing the operation of the apparatus when it determines that an image is still.
Figure 4:
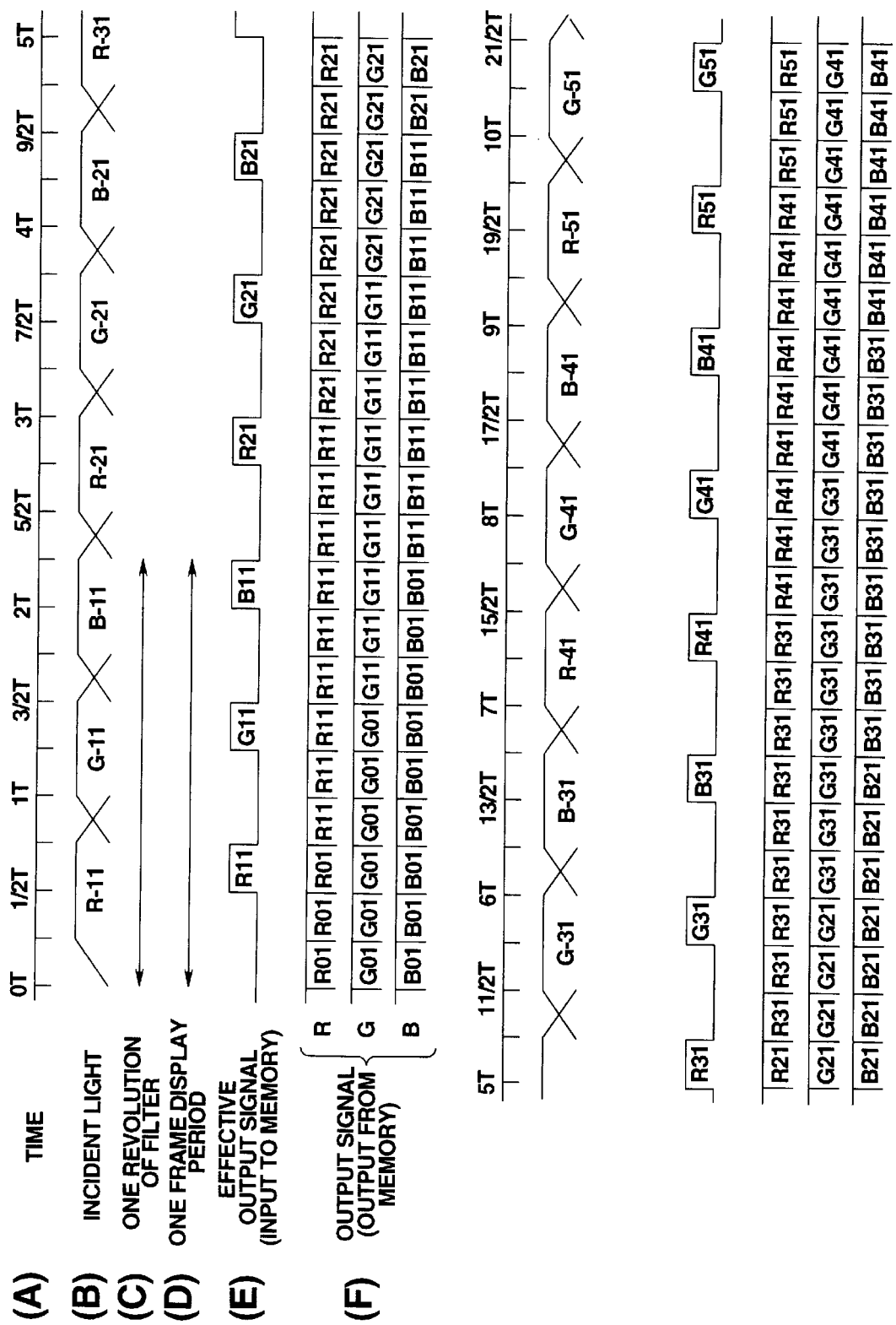
FIG. 4 is a timing diagram showing the operation of the apparatus when it determines that an image is dynamic.
Figure 5:
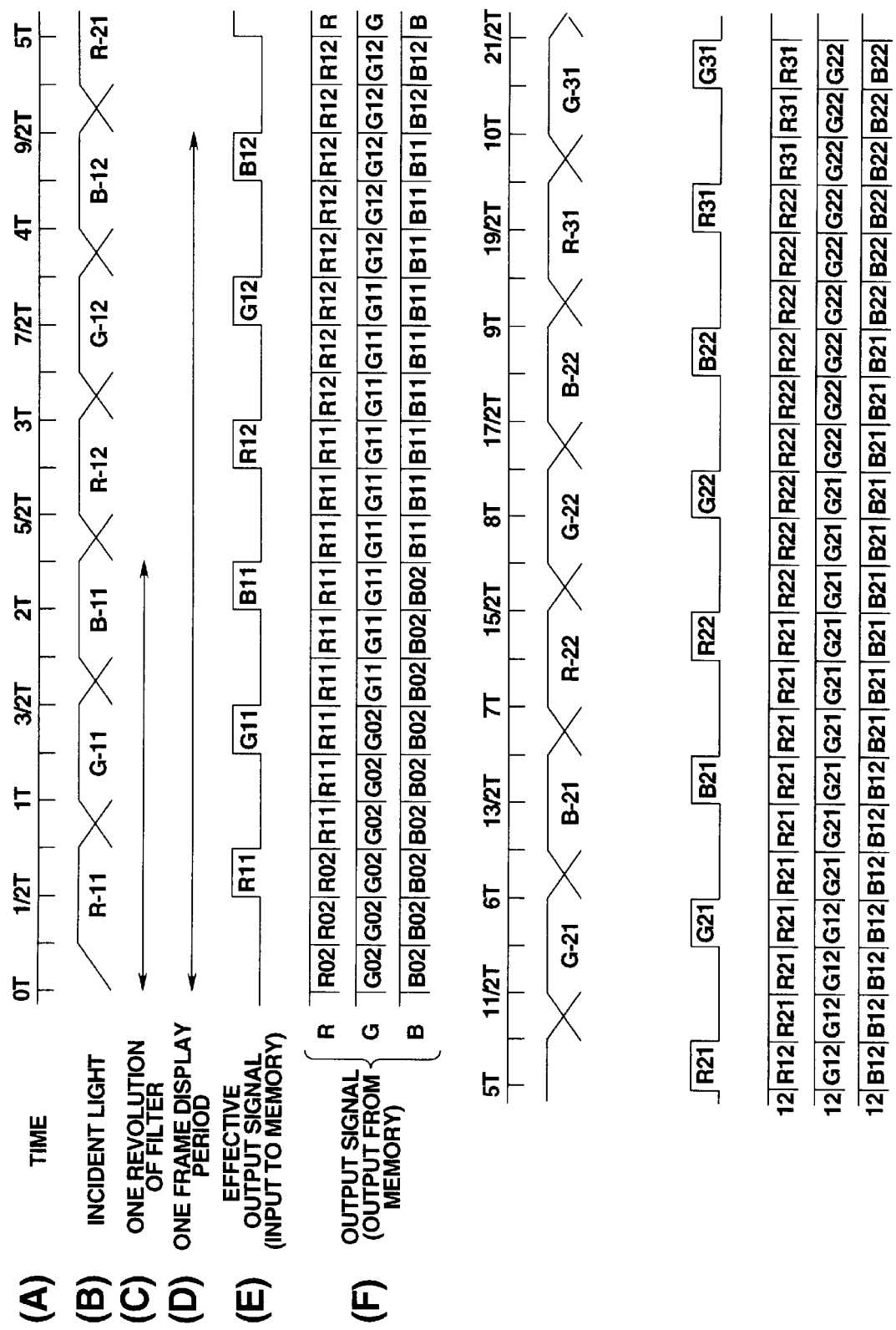
FIG. 5 is a timing diagram showing the operation of the apparatus when the speed of a dynamic image movement is at an intermediate level in the case of dynamic image.

Referring to FIGS. 1–5, a first embodiment of the present invention is shown. FIG. 1 is a block diagram showing a frame-by-frame color image pickup apparatus 1 of a first embodiment of the present invention, FIG. 2 shows a major portion of the image pickup device, and FIGS. 3–5 are timing diagrams of the operation of the apparatus.

In the frame-by-frame image pickup apparatus 1 of the first embodiment, an image pickup device 3 is arranged at the image plane in perpendicular alignment to the optical axis of an imaging lens or an image forming lens 2 for forming an optical image of an unshown subject, a rotating filter 4 having color filters that respectively transmit R, G and B light rays is mounted between the imaging lens 2 and the image pickup device 3, and the rotating filter 4 is driven by unshown driving means such as a motor.

By rotating filter 4, the R, G and B color filters are sequentially positioned in the light path, and optical images of tri-color R, G, and B wavelength spectrums are formed on the image pickup device 3. In response to a scan signal in synchronization with the irradiation period of each of the R, G, and B light wavelengths, from a scanning control module 5, the image pickup device 3 performs photoelectrical conversion to output, in a time series fashion, signals corresponding to the image of each wavelength spectrum (referred to as R, G and B signals).

Time-series R, G, and B signals are A/D-converted by an A/D converter 6 into corresponding digital R, G, and B signals, which are then sequentially stored in respective color memories 8R, 8G, and 8B under the control of a memory control module 7. These signals are read at the same timing and become concurrent color image data. The concurrent color image data is fed to a signal processing module 9 to be processed into R, G and B color signals. The R, G and B color signals are then fed to an unshown color monitor display, where the image of the subject is presented in color or fed to an image recording apparatus to be recorded there.

This embodiment comprises a motion detector 10, the output of which causes a scanning control module 5 and a memory control module 7 to switch in their operation between a dynamic image and a still image. Specifically, the motion detector 10 constitutes switching means for switching between a dynamic image display mode and a still image display mode.

In the dynamic image, the operation mode for image display is modified according to the amount of movement by the selection set in an unshown selection switch or changeover switch.

More particularly, an X-Y address type solid-state image pickup device is employed as the image pickup device 3, and the X-Y address type solid-state image pickup device is scanned in a noninterlace fashion. The scanning control module 5 switches the cells to be read in the image pickup device 3 at each revolution of the rotating filter 4, and the patterns of control of the scanning control module 5 and the memory control module 7 are switched in response to the detection of motion of the motion detector 10.

Referring to FIG. 2, all the X (horizontal rows)×Y (vertical columns) cells 11 in the image pickup device 3 are grouped into blocks, each including four cells arranged in one horizontal row by four vertical columns, by change-over switches 12, 13, 14, 15, . . . . More particularly, row cells at X=1 are horizontally successively arranged as follows: a first cell block made up of four cells of 1-1, 1-2, 1-3, and 1-4, a second cell block made up of four cells of 2-1, 2-2, 2-3, and 2-4, a third cell block made up of four cells of 3-1, 3-2, 3-3, and 3-4, a fourth cell block made up of four cells 4-1, 4-2, 4-3 and 4-4, . . . .

Any one of the four cells in each block is selected by respective change-over switches 12, 13, 14, 15, . . . . More particularly, the change-over switch 12 selects one of the four cells 1-1, 1-2, 1-3, and 1-4 in the first cell block, the change-over switch 13 selects one of the four cells 2-1, 2-2, 2-3 and 2-4 in the second cell block, the change-over switch 14 selects one of the four cells 3-1, 3-2, 3-3, and 3-4 in the third cell block, and the change-over switch 15 selects one of the four cells 4-1, 4-2, 4-3, and 4-4 in the fourth cell block.

Although FIG. 2 omits numerals for row cells at X=2 and further cells for simplicity, the four cells, for example, below the four cells 1-1, 1-2, 1-3 and 1-4 in the first cell block may be selected for reading by the change-over switch 12. The same is true of other cells.

In this embodiment, the rotational speed of the rotating filter 4 is increased without the need for an increase in the read speed in the image pickup device 3. Given an increase in the rotational speed of the rotating filter 4, the read speed naturally has to be increased accordingly if all cells are read without any skip in the image pickup device 3. In this embodiment, however, the number of cells to be read is modified (adjusted) in accordance with a frame display period. More particularly, no increase in the read speed is required because cells to be read are decimated.

For example, when the rotational speed of the rotating filter 4 is quadrupled (more generally, multiplied by p) to meet a dynamic image, and one frame period is shortened and set to be equal to the period of one revolution of the rotating filter 4, the number of cells is reduced to a quarter of the original number (more generally, 1/p of the original number) so that no modification is required in the read speed in the image pickup device 3. With this arrangement, no increase in the read speed is required. During a still image mode, one frame period is made long enough to read all the cells, and thus the degradation of resolution is precluded.

During one revolution of the rotating filter 4, only one cell in each block is read, horizontal scan switches 17a, 17b, 17c, 17d, . . . in a switch group 17 are sequentially turned on to output signals which are selected through change-over switches 12, 13, 14, 15, . . . , and the signals are then amplified by an amplifier in the image pickup device 3 and output through an output terminal to the A/D converter 6.

The scanning control module 5 that operates in response to the determination result given by the motion detector 10 controls on/off operations of the change-over switches 12, 13, 14, 15, . . . and the horizontal scan switch group 17 of 17a, 17b, 17c, 17d, . . . . In response to the on/off operations of these switches, the memory control module 7 controls writing to and reading from the memories 8R, 8G, and 8B so that a color still image or a color dynamic image in its proper mode is presented on a color monitor display (not shown) through the signal processing module 9.

More specifically, the motion detector 10 examines the motion of an image to determine whether the image is still or dynamic, and controls image displaying differently depending on the determination result as shown in FIG. 3 or FIG. 4.

For example, the motion detector 10 picks up the time series signals of the same color component after the A/D converter 6, and detects correlation among the signals, and determines that the image is still when the degree of correlation is equal to or greater than a predetermined threshold value that is set to nearly 100%, and determines that the image is dynamic when the degree of correlation is less than the predetermined threshold value. In case of a dynamic image, furthermore, the motion detector 10 determines the motion of the image at multi-levels depending on the degree of correlation, thus differentiating a fast-speed image from a slow-speed image.

When it determines that the image is still, very little color breakup or no color breakup at all takes place, and one frame display period is extended (to 9T, for example, as shown in FIG. 3) so as not to degrade the resolution of the image. The number of cells used for image displaying is increased. When the motion detector 10 determines that the image is dynamic, one frame display period is shortened (to 9T/4, for example, as shown in FIG. 4), the number of cells used for image displaying is reduced by decimating, and the decimated cells are compensated for by interpolation using neighboring cells.

In case of the determination of the dynamic image, a mode is available in which the control of image displaying is modified, for example, as shown in FIG. 5. The operation for image displaying is now discussed.

FIG. 3 illustrates the operation of the image pickup device in the still image mode. When the still image is determined, a scanning operation is performed in a noninterlace fashion as follows: the change-over switches 12, 13, 14, 15, . . . are activated to select one cell being read out of the cells in each block at each revolution of the rotating filter 4, and reading all the cells takes four cycles of revolution of the rotating filter 4. FIG. 3 shows the timing for concurrency processing.

Diagrams (A) through (F) of FIG. 3 respectively represent time, incident light rays, a period of revolution of a (rotating) filter, one frame display period, effective output signals (inputs to memories), and output signals (outputs from the memories). Diagrams (A) through (F) of each of FIGS. 4 and 5 also respectively represent the same signal items as those in FIG. 3.

The incident light rays R-11, G-11, B-11, R-12, . . . shown in the diagram (B) of FIG. 3 means that four cycles of revolution results in one frame image. For example, R-ij represents an R light ray of a j-th revolution in an i-th frame. In the effective output signals (inputs to the memories) R11, G11, B11, R12, . . . . shown in the diagram (E) of FIG. 3, Rij represents a signal of an image that is formed by the R light ray at the j-th revolution in the i-th frame. The output signals (the outputs from the memories) in the diagram (F) of FIG. 3 represent the signals corresponding to the diagram (E) of FIG. 3. For example, R04 represents a signal that resides in the R-memory 38R prior to time T=0.

The sequence of reading of the cells is set as follows. The change-over switches 12, 13, 14, 15, . . . shown in FIG. 2 are activated each cycle of revolution of the rotating filter 4, for example, a first cell in each cell block is selected, more particularly, 1-1, 2-1, 3-1, 4-1, . . . are read at a first cycle of revolution, and 1-2, 2-2, 3-2, 4-2, . . . are read at a second cycle of revolution, and this operation is repeated. A pseudo field is formed by the cells read at each cycle of revolution.

The number of cells read at a single cycle of revolution is as small as ¼ of all the cell members. In terms of a timing diagram, during still image displaying, four pseudo fields, each constructed of a quarter of the full cells, are obtained during four cycles of revolution of the rotating filter 4, and are combined by the memories 8R, 8G, and 8B to form one frame. In terms of a timing diagram, one pseudo field corresponds to a duration of 9T/4 with T representing one frame period, and a combination of four pseudo fields, namely 9T, forms one full display frame. More particularly, a high-resolution color image is obtained by reading all the cells during four revolutions.

FIG. 4 shows display timing when the motion detector 10 detects a dynamic image. As can be seen from the diagrams (C) and (D) of FIG. 4, one revolution of the rotating filter 4 corresponds to one frame display period. The incident light rays are R-11, G-11 and B-11 (in the same way as the case shown in FIG. 3) during a first cycle of revolution of the rotating filter 4 and R-21, G-21, and B-21 during a second cycle of revolution starting at 9T/4 (from 9T in FIG. 3).

The image pickup device 3 switches the cells being read each cycle of revolution of the rotating filter 4 as shown in FIG. 3 while the image pickup device 3 performs no such switching with a particular cell in each block being read with the remaining cells decimated as shown in FIG. 4.

More particularly, the change-over switches 12, 13, 14, 15, . . . shown in FIG. 2 are fixed so that 1-1, 2-1, 3-1, 4-1, . . . , for example, are always read, a pseudo field that is decimated to a quarter is treated as one frame per revolution of the rotating filter, and then used four times by the memories 8R, 8G, and 8B for compensation, and then updated. In terms of a timing diagram, the same data of a pseudo field obtained during 9T/4 is used for four cells in row, and one frame is always 9T/4 long.

In this way, one frame image display is made possible during a read time of the number of cells smaller than the number of cells in each field. This arrangement effectively works in such a case where color breakup takes place during a read time for the cells even in one field (in contrast to the second known technique which needs a read time for reading the cells in one field, this embodiment forms an image of one frame within half the read time the second known technique requires). By increasing the number of cell members within each block, an image formation of one frame is performed even in a shorter time.

When the motion detector 10 detects the motion of an image, the speed of the dynamic image motion is recognized, and the number of cells used for reading is changed in accordance with the level of the speed. Such a multi-level image displaying rate mode of operation will be discussed below.

The motion detector 10 recognizes the speed of the image at three different levels, and depending on a detected level, interpolation or compensation patterns in reading the image pickup device 3 and the memories are switched. When the motion detector 10 determines that the image moves at the highest speed, the pattern (timing) shown in FIG. 4 is selected. When the motion detector 10 determines the image moves at the intermediate level of speed, the pattern shown in FIG. 5 is selected.

Referring to the diagram (D) of FIG. 5, one frame display period is set to be equal to the period of two cycles 9T/2 of revolution of the rotating filter 4. This period is twice the period shown in FIG. 4.

When the image is displayed in the timing shown in FIG. 5, the four-cell change-over switches shown in FIG. 2 switch between any two cells in each block at the timing of each pseudo field. Two cells in each block are read with the remaining two cells left unused for displaying. In terms of a timing diagram, one pseudo field corresponds to 9T/4, and two pseudo fields 9T/2 constitute one frame.

When the motion detector 10 determines that the image is slow, one frame display period is set to be equal to three cycles of revolution 27T/4 of the rotating filter 4, though its timing diagram is not shown. As the rotating filter 4 rotates one revolution, one cell is selected from each cell block, and for the third cycle of revolution, the first cell in each cell block is again selected with the third cell in each block skipped. That is, three cells of the four cells in each block are used with the remaining one cell unused. The lack of cells in one frame is compensated for by interpolation using neighboring cells. One frame thus corresponds to three cycles 27T/4 of revolution of the rotating filter 4.

Besides the multi-level image displaying rate mode of operation based on motion detection, a user may manually override cell selection using an external switch depending on the purpose of the user's application.

In the frame-by-frame color image pickup apparatus 1 of this embodiment, the cells in the image pickup device 3 are grouped into a plurality of blocks according a predetermined number of cells, an arbitrary cell within each block is selected, the motion detector 10 determines the motion of an image, one frame display period is extended to increase the number of cells to be read within each frame display period when the motion detector 10 determines that the image is still. More particularly, all the cells are read, and a crisp image is thus presented without the risk of degrading the display resolution.

When the motion detector 10 determines that the image is dynamic, cell reading is performed with some cells decimated to shorten one frame display period. Thus, the image is presented with a very little color breakup or no color breakup at all. Since the number of cells being read is modified in accordance with the frame display period, image presentation is performed without changing the read speed in the image pickup device 3. With this arrangement, the apparatus may be constructed in a simple design at a reduced cost.

In the above discussion, all the cells in the image pickup device 3 are grouped into cell blocks, each made up of cells in one horizontal row x four vertical columns. More generally, each block may be cells of one row×n columns, where n is a natural number (i.e. a real integer) equal to or greater than 2, namely, n=2, 3, 4, . . . If, in this case, any particular cell only within each block is read at each cycle of revolution of the rotating filter 4, the pickup rate of the cells may be heightened to n times the original rate.

If the cells in the image pickup device 3 are grouped into a plurality of blocks, each made up of cells of m horizontal rows×n vertical columns, and if any particular cell only within each block is read at each cycle of revolution of the rotating filter 4, the pickup rate may be heightened to n×m times the original rate, where n and m are natural numbers, and at least one of n and m is equal to or greater than 2.

In the arrangement in which each cell block includes the cells arranged in n horizontal rows×m vertical columns, and the cell being read is shifted one by one within each block each cycle of revolution of the rotating filter 4 so that a total of only b cells within each block are read, the value b may be modified depending on the speed of a subject when it is moving. In accordance with the speed of the subject, compensation through the memories may be adjusted to set a pickup rate and resolution in a multi-level fashion.

Figure 6:
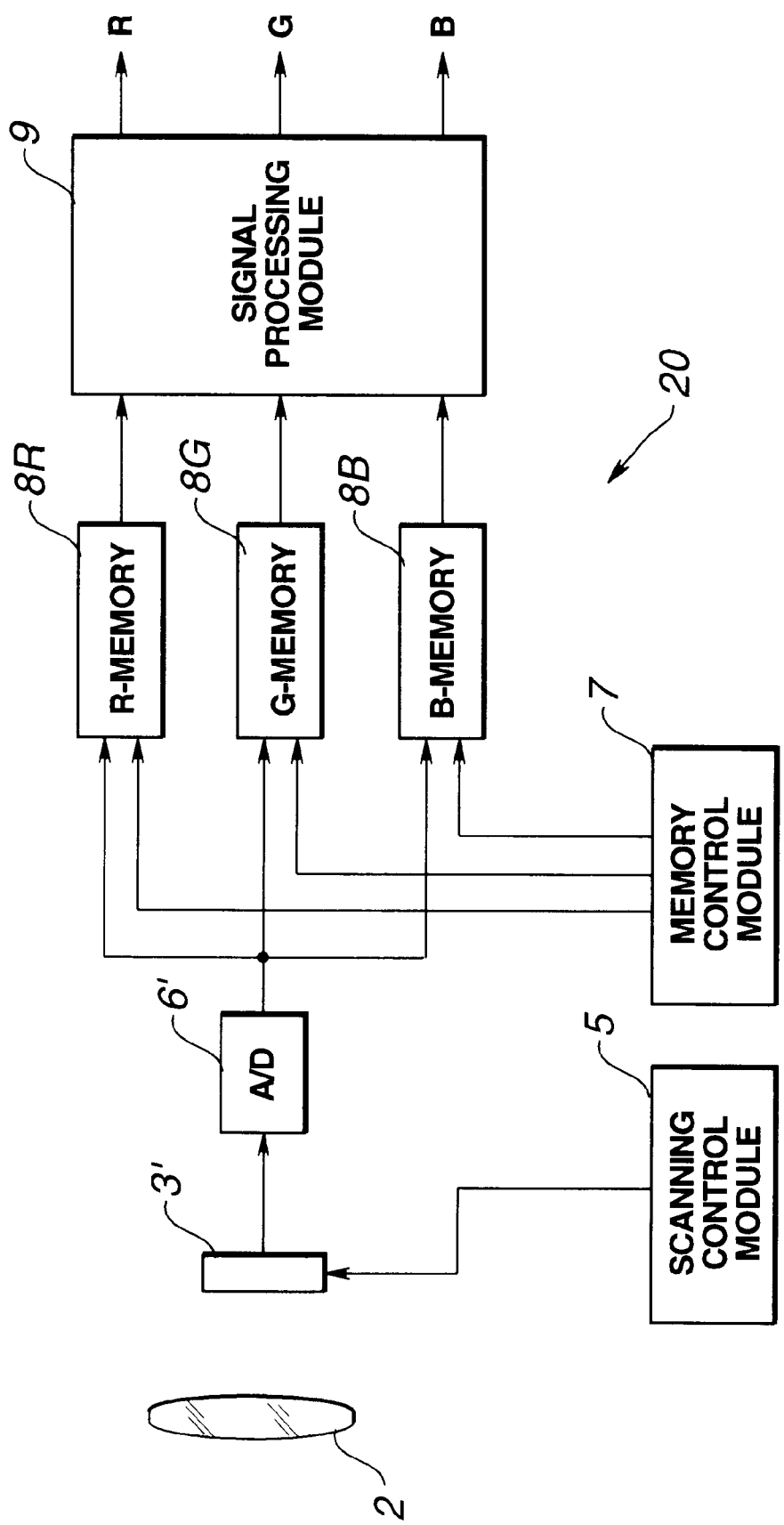
FIG. 6 is a block diagram showing a frame-by-frame color image pickup apparatus of a second embodiment of the present invention.
Figure 7:
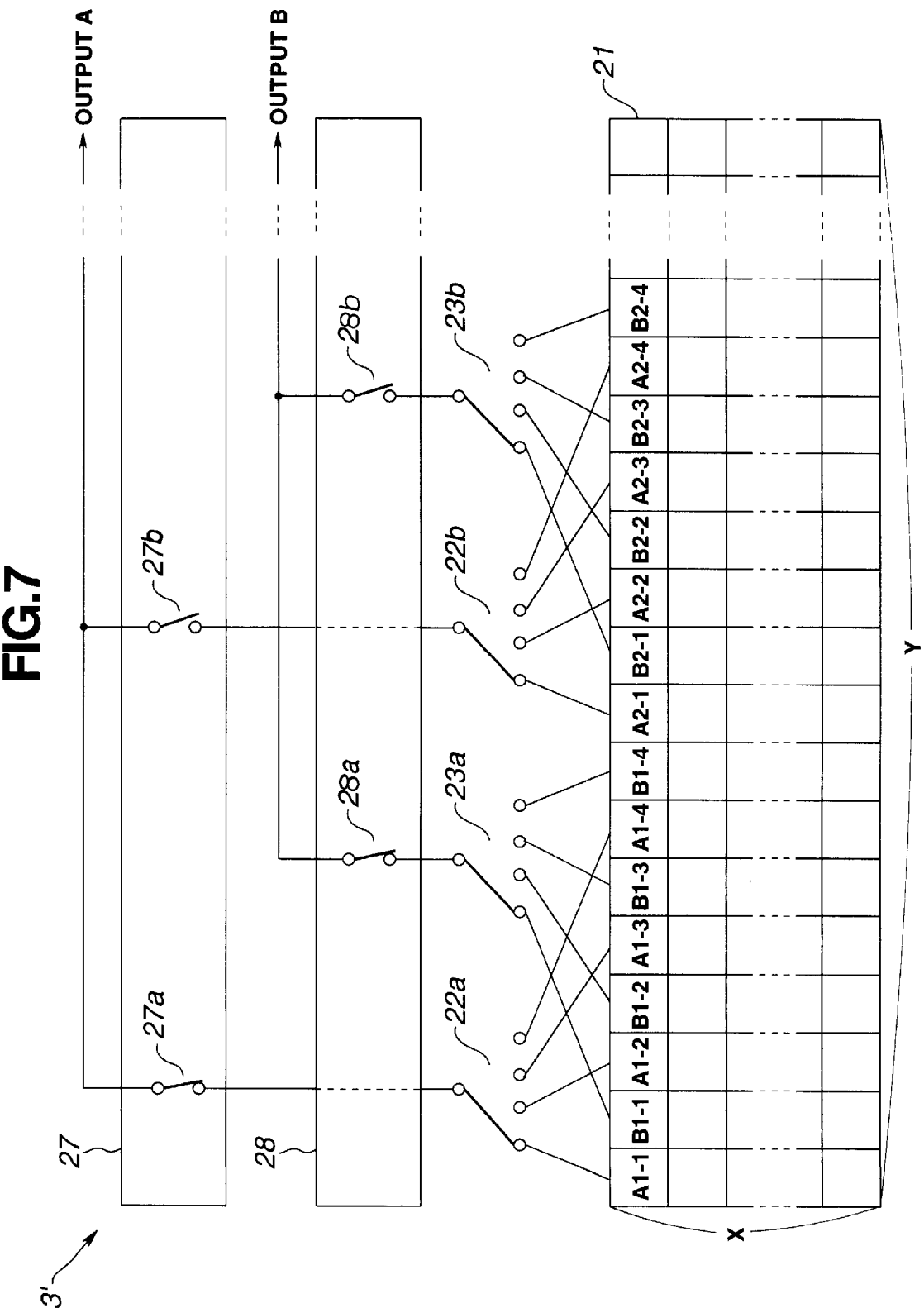
FIG. 7 shows a major portion of the image pickup device which performs two-line reading in the embodiment of FIG. 6.

A second embodiment of the present invention is now discussed. FIG. 6 is a block diagram showing a frame-by-frame color image pickup apparatus 20 of the second embodiment of the present invention. FIG. 7 shows a major portion of the image pickup device in the second embodiment. The first embodiment performs a single line reading, while the second embodiment works in the same way the first embodiment but with a dual-line reading.

Referring to FIG. 6, a frame-by-frame color image pickup apparatus 20 employs a dual-line reading image pickup device 3' instead of the image pickup device shown in FIG. 2, and an A/D converter 6' for dual-line reading instead of the A/D converter 6 shown in FIG. 1. The rotating filter 4 is designed to rotate at a speed twice the speed of the first embodiment.

As shown in FIG. 7, all the cells arranged in X (horizontal rows)×Y (vertical columns) in the image pickup device 3' are read by two horizontal lines. The image pickup device 3' employs two horizontal scan switch groups 27, 28 instead of the single horizontal scan switch group 17 in the image pickup device 3 shown in FIG. 2. The horizontal scan switch group 27 is constructed of switches 27a, 27b, . . . and the horizontal scan switch group 28 is constructed of switches 28a, 28b, . . . .

All the cells in the image pickup device 3' are grouped into cell blocks, each made up of eight cells arranged in one row×eight columns, and each of paired change-over switches, 22a and 23a in pair, 22b and 23b in pair, . . . is used to select one cell from their respective semi-blocks, each made up of four cells belonging to an A line or a B line. More particularly, eight cells in a first block A1-1, B1-1, A1-2, B1-2, A1-3, B1-3, A1-4, and B1-4 at a horizonal row at X=1, the switch 22a is connected to select one cell from the four cells of A1-1, A1-2, A1-3 and A1-4 in the A line, and the switch 23a is connected to select one cell from the four cells of B1-1, B1-2, B1-3 and B1-4 in the B line. The switch 22a is connected to the switch 27a in the horizontal scan switch group 27 and the switch 23a is connected to the switch 28a in the horizontal scan switch group 28.

As for eight cells A2-1, B2-1, A2-2, B2-2, A2-3, B2-3, A2-4, and B2-4 in a second block, the switch 22b is connected to select one cell from the four cells of A2-1, A2-2, A2-3 and A2-4, and the switch 23b is connected to select one cell from the four cells of B2-1, B2-2, B2-3 and B2-4. The switch 22b is connected to the switch 27b in the horizontal scan switch group 27 and the switch 23b is connected to the switch 28b in the horizontal scan switch group 28. The remaining cells are arranged in a similar fashion.

Signals from the cells in the A line selected by the switches 22a, 22b . . . . are sequentially picked up as an output A by the switches 27a, 27b, . . . in the horizontal scan switch group 27, and are fed to the A/D converter 6', while signals from the cells in the B line selected by the switches 23a, 23b, . . . are sequentially picked up as an output B by the switches 28a, 28b, . . . in the horizontal scan switch group 28, and are fed to the A/D converter 6'.

In this embodiment, again, the motion detector 10 determines whether an image is still or dynamic, and depending on the determination result, image display pattern is modified in the same way as in the first embodiment.

The signals from the cells selected by the switches 22a, 23a, 22b, 23b . . . . shown in FIG. 7 are switched at each cycle of revolution of the rotating filter 4.

More particularly, when the motion detector 10 determines that an image is still, cells A1-1, A2-1, . . . in the A line are read through switches 22a, 22b, . . . , respectively, and cells B1-1, B2-1, . . . in the B line are read through switches 23a, 23b, . . . , respectively, at a first cycle of revolution of the rotating filter 4. At a second cycle of revolution, cells A1-2, A2-2, . . . in the A line are read through switches 22a, 22b, . . . , respectively, and cells B1-2, B2-2, . . . in the B line are read through switches 23a, 23b, . . . , respectively.

At a third cycle of revolution, cells A1-3, A2-3, . . . in the A line are read through switches 22a, 22b, . . . , respectively, and cells B1-3, B2-3, . . . in the B line are read through switches 23a, 23b, . . . , respectively. At a fourth cycle of revolution, cells A1-4, A2-4, . . . in the A line are read through switches 22a, 22b, . . . , respectively, and cells B1-4, B2-4, . . . . in the B line are read through switches 23a, 23b, . . . , respectively.

The signals from the cells in the A line which are respectively selected by the switches 22a, 22b, . . . are sequentially read through the switches 27a, 27b, . . . in the horizontal scan switch group 27 to give the output A to the A/D converter 6' while the signals from the cells in the B line which are respectively selected by the switches 23a, 23b, . . . are sequentially read through the switches 28a, 28b, . . . to give the output B to the A/D converter 6'.

Four cycles of revolution correspond to one frame display period. Since this embodiment employs the two-line reading technique in which two cells, one from each of the A and B lines, are simultaneously read (given the same number of cells and the same read speed in the image pickup device as in the first embodiment), the read speed in this embodiment is virtually twice that in the first embodiment, and thus the rotational speed of the rotating filter 4 is allowed to be doubled. More particularly, this embodiment allows an operation identical to the operation of the first embodiment shown in FIG. 3 to perform twice as fast as the original read speed in the first embodiment.

When the motion detector 10 determines that an image is dynamic, the number of cells being read in each semiblock of both the A line and B line is only one. In this way, an operation identical to the operation of first embodiment shown in FIG. 4 is performed twice as fast as the original read speed in the first embodiment.

Furthermore, an operation identical to the operation of the first embodiment shown in FIG. 5 will be performed twice as fast as the original speed in the first embodiment.

The frame-by-frame color image pickup apparatus 20 of the second embodiment achieves a fast read speed besides the advantages of the first embodiment.

The second embodiment achieves a doubled read speed in this way. Alternatively, the number of cells being read may be increased rather than increasing the read speed. By doubling the number of cells being read, a higher resolution image displaying may be performed within the same frame display period as the first embodiment.

The second embodiment has been discussed in conjunction with the two-line reading method. Furthermore, a three-line reading method is perfectly acceptable. The number of cells in each cell block are not limited to the ones in the first and second embodiments. Depending on the still image or dynamic image, the display patterns may be modified with cell blocks, each arranged to have a number of cells different from those described in conjunction with the first and second embodiments.

In this way, the first and second embodiments permit a diversity of modifications by changing the switching patterns with the change-over switches and the number of cells being switchably selected.

The above embodiments have been discussed in conjunction with the color filters that transmit R, G and B light rays as the three color reference lights for color image forming. Alternatively, a rotating filter permitting other light rays as the three color reference lights may be used.

Figure 8:
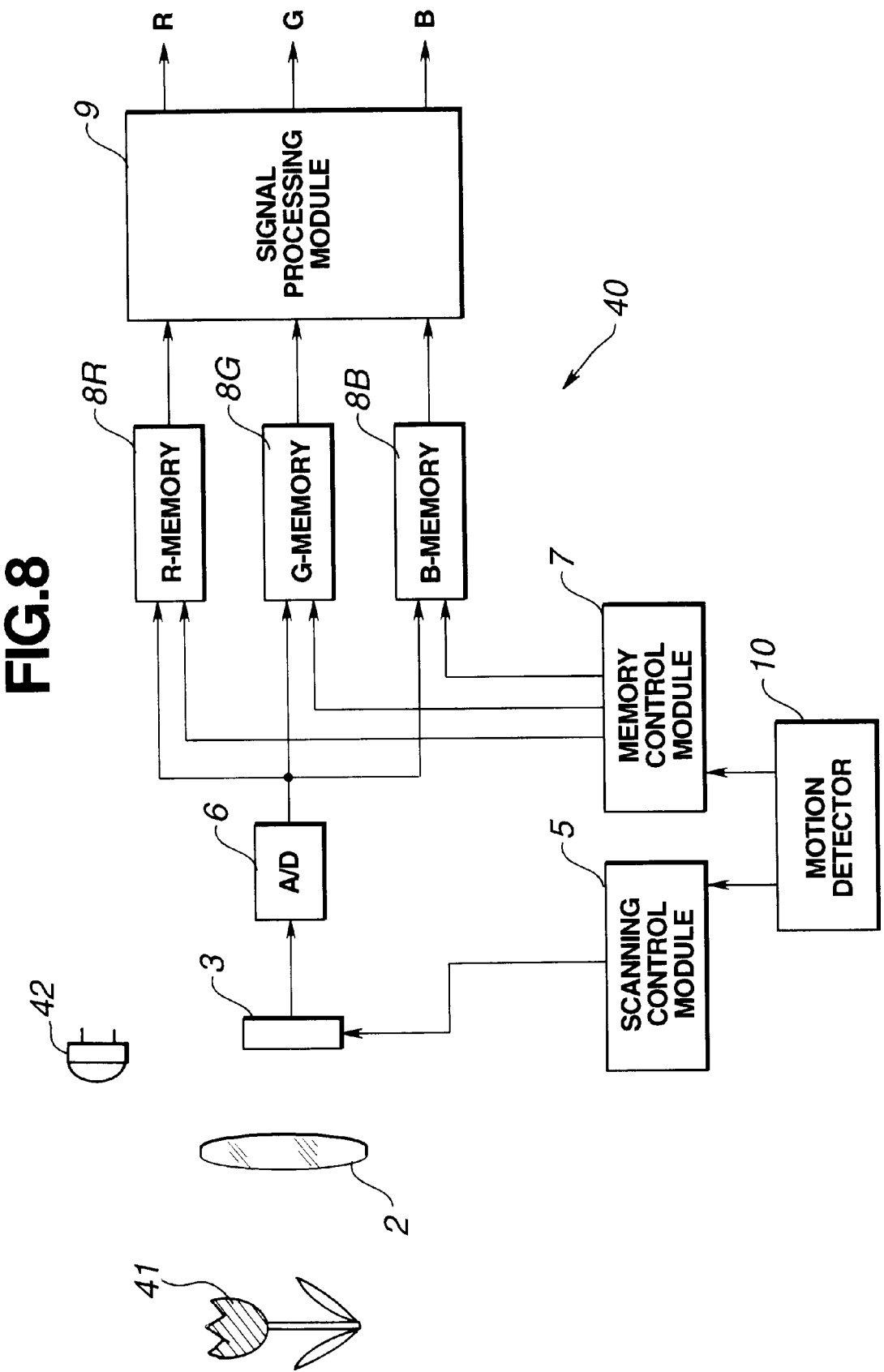
FIG. 8 is a block diagram showing a frame-by-frame color image pickup apparatus of a third embodiment of the present invention.

A third embodiment of the present invention is now discussed. FIG. 8 is a block diagram showing a frame-by-frame color image pickup apparatus 40 of the third embodiment of the present invention.

The frame-by-frame color image pickup apparatus 40 employs LED 42 that emits sequentially tri-color R, G, and B light rays as a light source for illuminating a subject 41, and dispenses with the rotating filter 4. The rest of construction of the third embodiment remains identical to that of the first embodiment.

In the frame-by-frame color image pickup apparatus 40, the reference color light rays that are sequentially emitted by LED 42 are reflected off the subject 41, and R, G, and B image signals derived from the reflected light rays are read from the image pickup device 3 in a time series fashion. The processes of the image signals thereafter remain identical to those in the first embodiment.

Besides the advantage of the first embodiment, the frame-by-frame color image pickup apparatus 40 of the third embodiment permits a compact and simplified design feature, because no rotating filter is employed.

Figure 9:
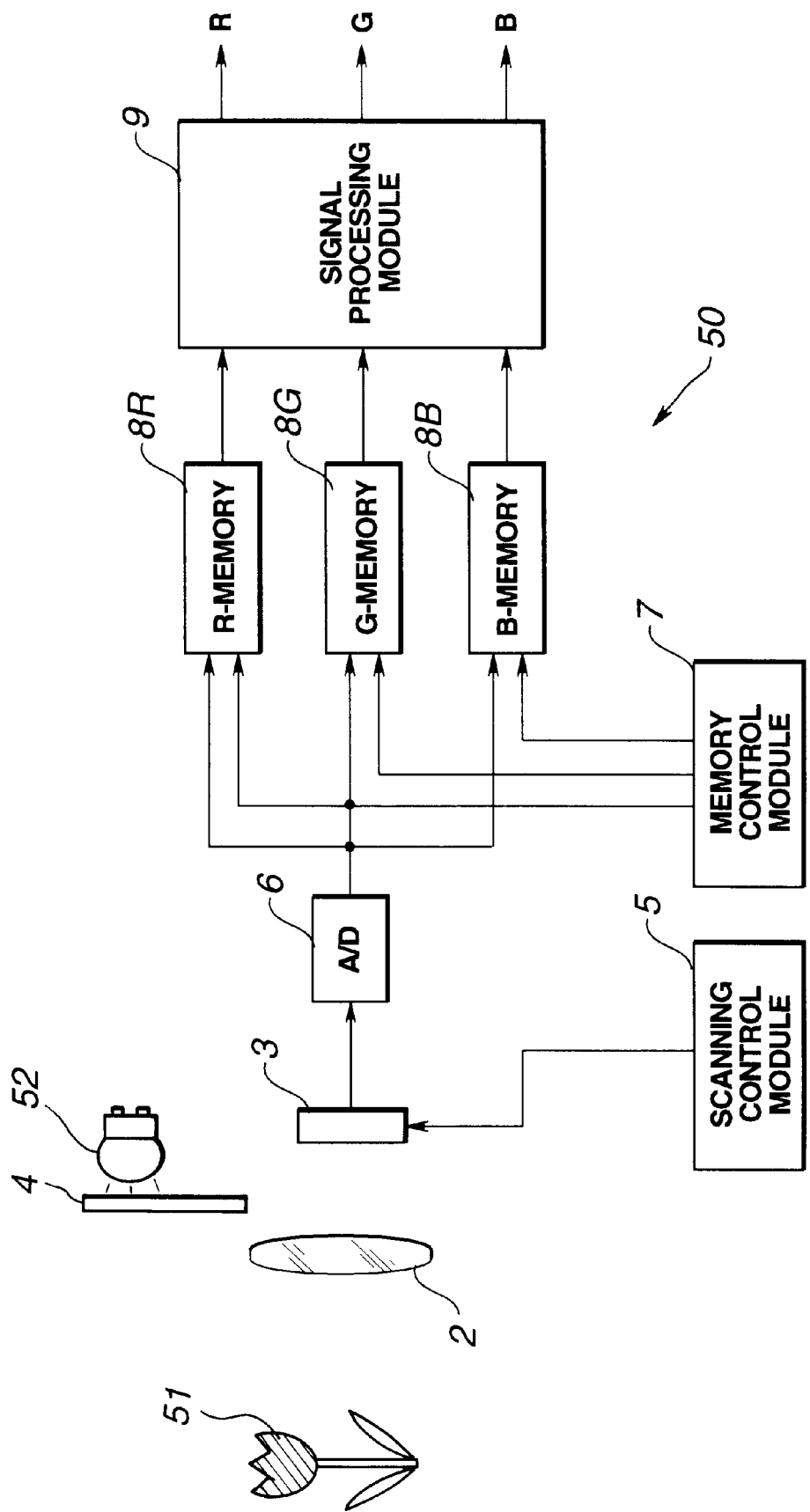
FIG. 9 is a block diagram showing a frame-by-frame color image pickup apparatus of a fourth embodiment of the present invention.
Figure 10:
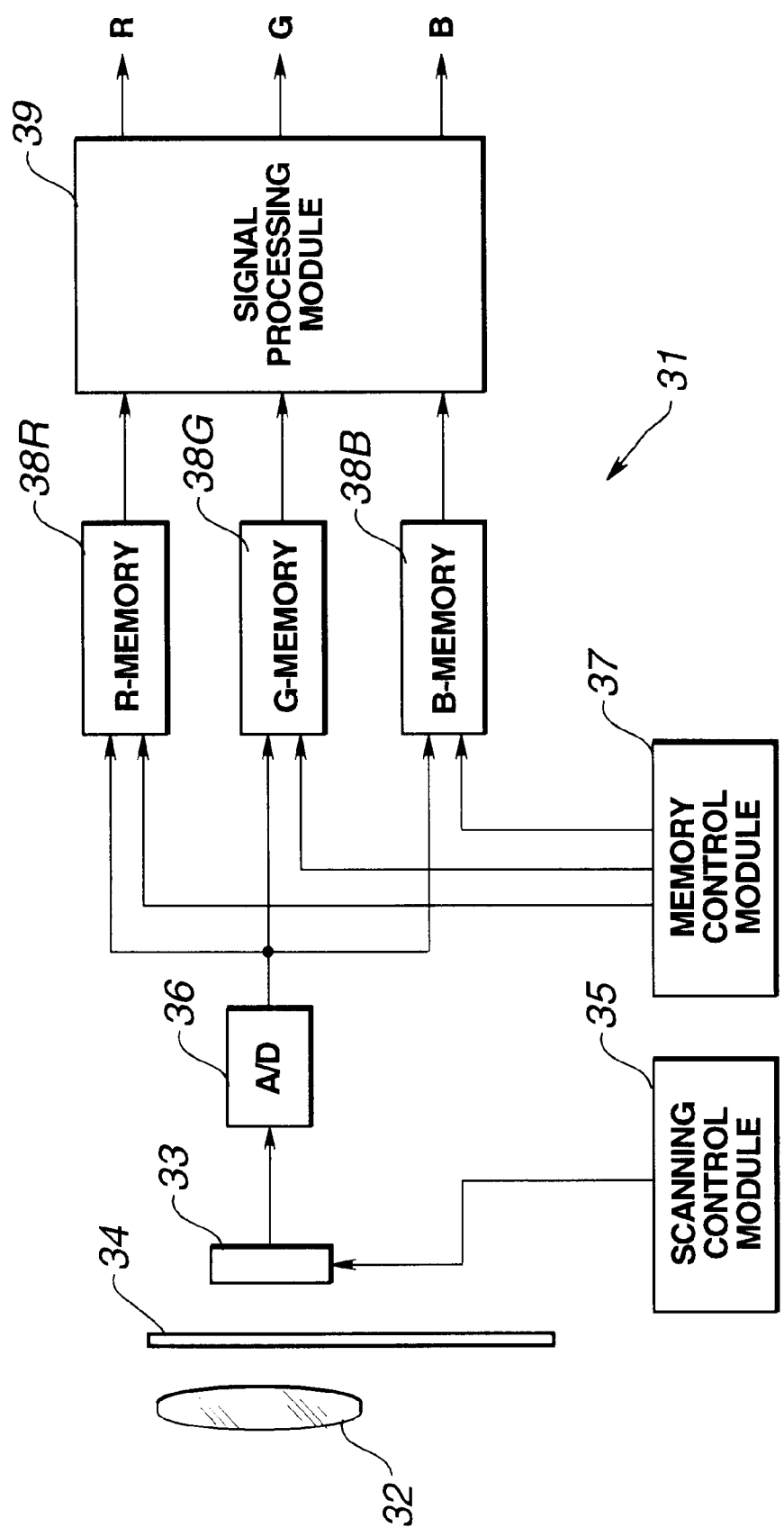
FIG. 10 is a block diagram showing a known frame-by-frame color image pickup apparatus.
Figure 11:
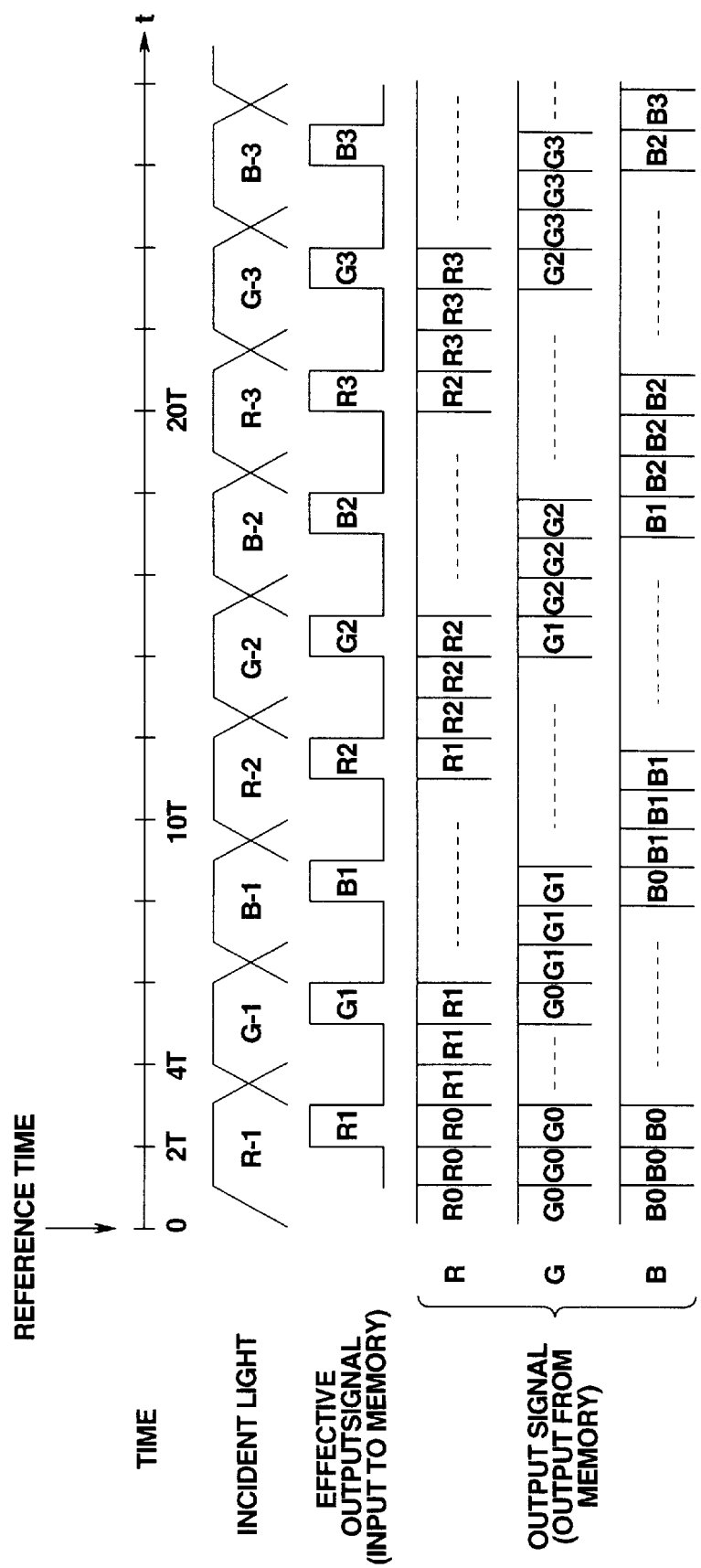
FIG. 11 is a timing diagram showing the operation of the apparatus of FIG. 10.

A fourth embodiment of the present invention is now discussed. FIG. 9 is a block diagram showing a frame-by-frame color image pickup apparatus 50 of the fourth embodiment of the present invention.

The frame-by-frame color image pickup apparatus 50 employs a white light source 52 as a light source for illuminating a subject 51, and in front of the white light source 52 a rotating filter 4 comprising R, G, and B tri-color reference filters. The rest of construction of the fourth embodiment remains identical to that of the first embodiment.

In the frame-by-frame color image pickup apparatus 50, the light rays emitted from the white light source 52 are transmitted through the rotating filter 4, and projected to the subject 51 as the reference color light rays. R, G and B image signals derived from light rays reflected from the subject 51 are read from the image pickup device 3 in a time series. The processes of the image signals thereafter remain identical to those in the first embodiment.

Besides the advantage of the first embodiment, the frame-by-frame color image pickup apparatus 50 of the fourth embodiment permits a good image of the subject 51 to be formed even under low light level conditions.

Other embodiments may be constructed by partly combining the above embodiments. Such embodiments fall within the scope of the present invention.

The frame-by-frame color image pickup apparatus according to each of the above embodiments of the present invention, which sequentially introduces three reference color spectrum light rays to the single image pickup device on a discrete time basis, and then reads an image signal of each reference color in a time series fashion, comprises switching means for switching to comply with a dynamic image and a still image, an image pickup device having cells which are grouped into blocks, and selecting an arbitrary cell within each block from which a signal is read, and a memory for concurrently outputting a time series image signal for each reference color, wherein the image pickup device selects the arbitrary cell within each block by means of the switching means. Depending on the dynamic image or the still image, the rotational speed of the rotating filter is modified or the cell selected from the block is changed in synchronization with the switching of color emission. Thus, the apparatus presents a color image with less color breakup during a dynamic image displaying, while presenting a high resolution color image during a still image displaying.

Decimated image reading is performed during the dynamic image displaying. In each of the tri-color signals, cells smaller in number than the cells that are read in one field in an ordinary interlace scan are read in one period within which the image signal of each reference color is read in a time series fashion, and is then treated as a pseudo field. Decimated cells may be compensated for through memories. In this way, an image of one frame is produced per one period. Thus, the pickup rate of the image signals of the three reference colors is increased without the need for increasing the read speed in the image pickup device, and color breakup is thus prevented.

Whether an image is still or dynamic is automatically determined, and the still image and dynamic image are each presented in their optimum fashion.

In the apparatus of a multi-line reading type, the pickup rate of the image signals of the three reference colors is increased without the need for increasing the read speed in the image pickup device, and color breakup is thus prevented.

What is claimed is:

1. A frame-by-frame color image pickup apparatus, which sequentially introduces three reference color spectrum light rays to a single image pickup device on a discrete time basis, and then reads an image signal of each reference color in a time series fashion, comprising switching means for switching to comply with a dynamic image and a still image, an image pickup device having photoelectric conversion elements arranged in cells, which cells are grouped into blocks, for selecting an arbitrary cell within each block from which a signal is read, and a memory for concurrently outputting a time series image signal for each reference color, wherein the image pickup device selects an arbitrary cell within said each block, for transfer to said memory, by means of the switching means.

2. A frame-by-frame color image pickup apparatus according to claim 1, wherein the image pickup device reads each of said blocks with a particular cell therein decimated.

3. A frame-by-frame color image pickup apparatus according to claim 1, wherein the image pickup device has a plurality of output lines for simultaneously reading a plurality of cells to carry out multi-line reading.

4. A frame-by-frame color image pickup apparatus according to claim 1, wherein the switching means switches cells to be read based on an automatic determination of whether an image is a still or a dynamic image.

5. A frame-by-frame color image pickup apparatus according to claim 1, wherein the block includes cells arranged in n horizontal rows by m vertical columns, wherein n and m are natural numbers and at least one of n and m is equal to or greater than 2.

6. A frame-by-frame color image pickup apparatus according to claim 1, wherein the memory includes means which interpolates between read cells with respect to a decimated cell in accordance with the ratio of decimation during reading.

7. A frame-by-frame color image pickup apparatus according to claim 1, wherein the image pickup device reads particular cells out of all the cells over one period during which an image signal of each reference color is read in a time series fashion.

8. A frame-by-frame color image pickup apparatus according to claim 1, wherein the switching means performs a multi-level switching operation depending on a motion speed of a dynamic image to select cells being read and the memory includes means which performs interpolation.

9. A frame-by-frame color image pickup apparatus according to claim 2, wherein the block includes cells arranged in n horizontal rows by m vertical columns, wherein n and m are natural numbers and at least one of n and m is equal to or greater than 2.

10. A frame-by-frame color image pickup apparatus according to claim 2, wherein the memory includes means which interpolates between read cells with respect to a decimated cell in accordance with the ratio of decimation during reading.

11. A frame-by-frame color image pickup apparatus according to claim 2, wherein the image pickup device reads particular cells out of all the cells over one period during which an image signal of each reference color is read in a time series fashion.

12. A frame-by-frame color image pickup apparatus according to claim 2, wherein the switching means performs a multi-level switching operation depending on a motion speed of a dynamic image to select cells being read and the memory includes means which performs interpolation.

13. A frame-by-frame color image pickup apparatus according to claim 1 wherein the three reference color spectrum light rays are obtained using a rotating color wheel in front of the image pickup device.

14. A frame-by-frame color image pickup apparatus according to claim 1 wherein the three reference color spectrum light rays are obtained by sequentially illuminating a subject with three reference colors.

15. A method for obtaining a frame-by-frame color image employing an image pickup device having a plurality of cells, each cell having a plurality photoelectric conversion elements, the method comprising the steps of:

(a) dividing the plurality of cells into blocks so that each block contains a given number of cells;

(b) sequentially exposing all of the cells to three reference colors at a given rate;

(c) sequentially transferring the images from the cells for each reference color to a memory in sequential fashion;

(d) determining if the image is a still image or a dynamic image;

(e) selecting an arbitrary cell in each block from which an image signal is transferred to memory based on the determination in step (d); and (f) reading out the sequentially stored images of the three reference colors concurrently to form a color image.

16. The method of claim 15 wherein step (d) further comprises detecting correlation of the same color components to determine if the image is a dynamic image or a still image.

* * * * *

UNITED STATES PATENT AND TRADEMARK OFFICE
CERTIFICATE OF CORRECTION

PATENT NO. : 6,005,616
DATED : December 21, 1999
INVENTOR(S) : Itoh et al.

It is certified that error appears in the above-identified patent and that said Letters Patent is hereby corrected as shown below:

Title page,
ABSTRACT,
Line 4, after the word "with", delete "rotating" and insert therefor -- a --.

Column 1,
Line 49, after the word "an", delete "unshorn" and insert therefor -- unshown --.

Column 2,
Line 18, after the word "thus", delete "concurrency" and insert therefor -- concurrently --.
Line 21, after the word "signals", delete "concurrency" and insert therefor
-- concurrently --.

Signed and Sealed this

Twelfth Day of March, 2002

Attest:

Attesting Officer

JAMES E. ROGAN
*Director of the United States Patent and Trademark Office*